Sept. 1, 1936.　　　G. H. CONNORS　　　2,053,132
TRACTOR TRAILER COUPLING MECHANISM
Filed June 27, 1936　　　4 Sheets-Sheet 1
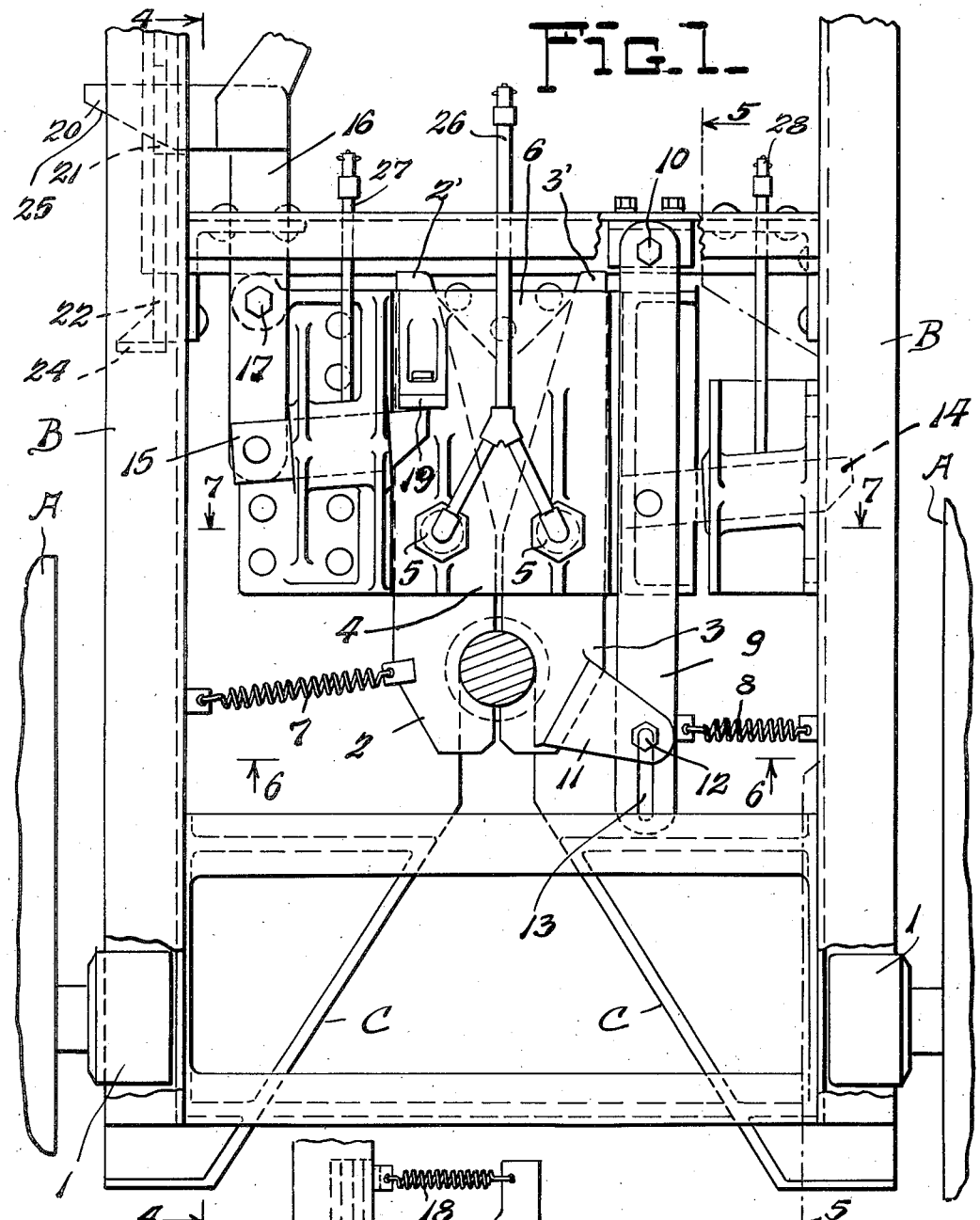
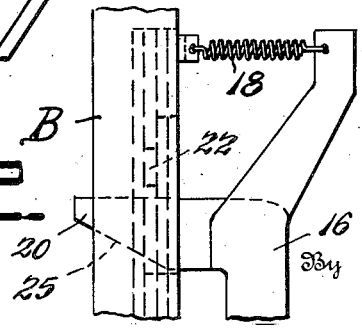
Inventor
GEORGE H. CONNORS.

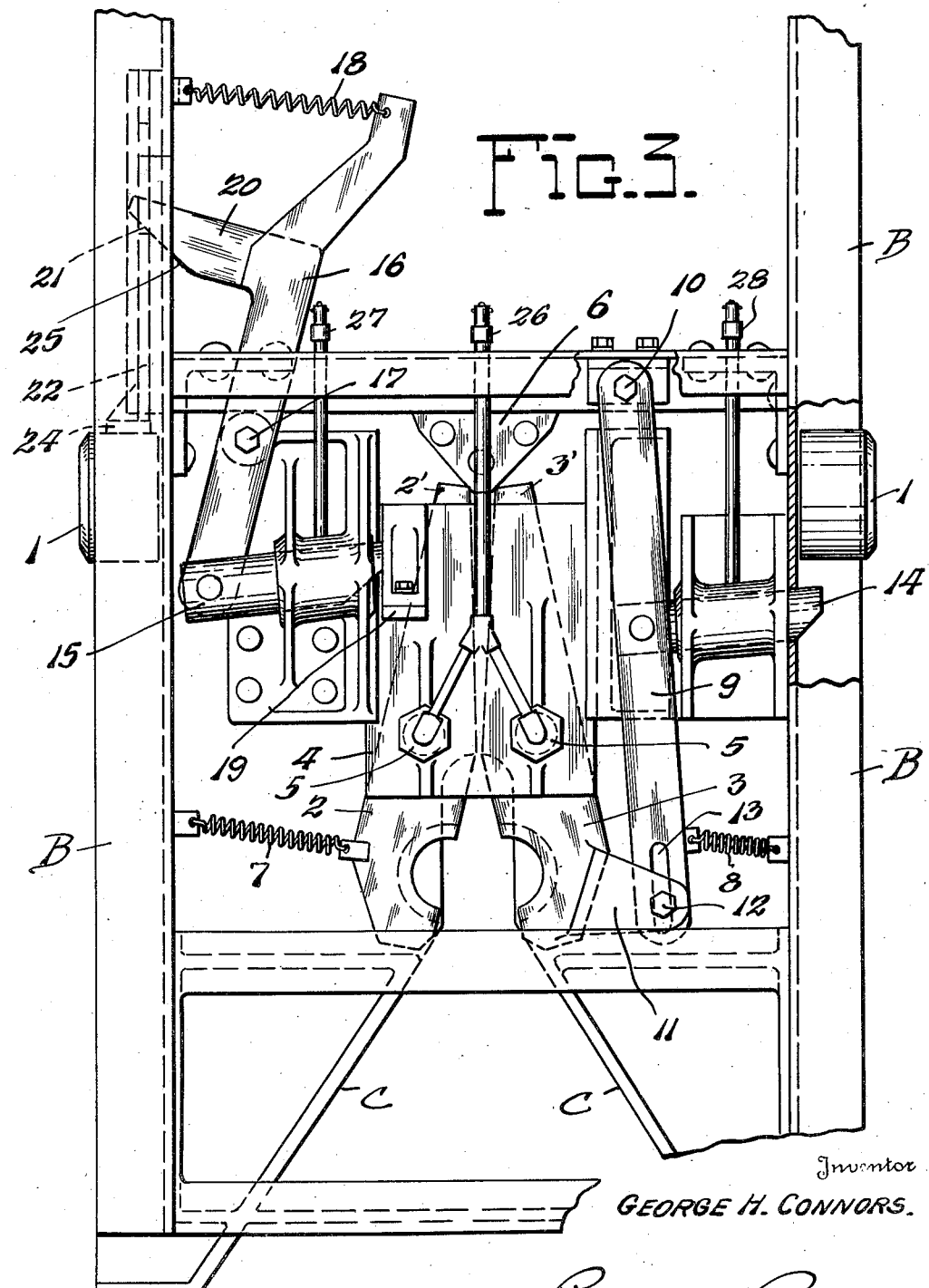

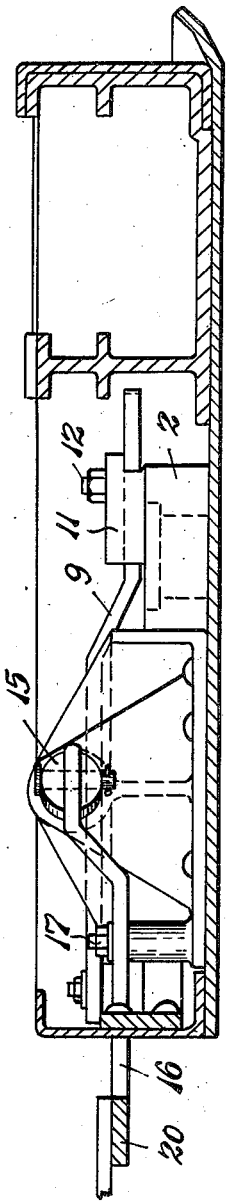
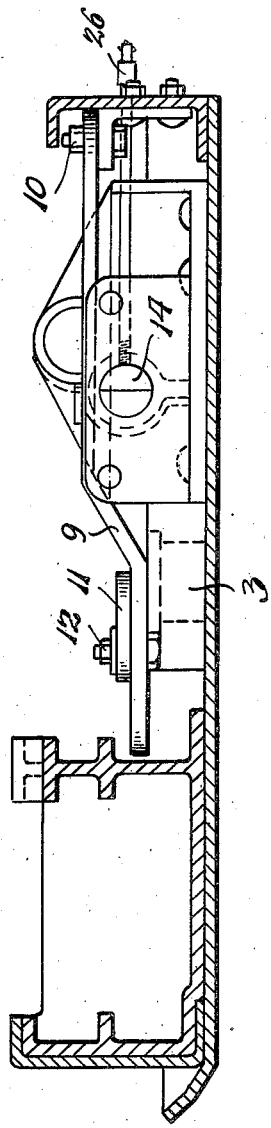

Sept. 1, 1936.   G. H. CONNORS   2,053,132
TRACTOR TRAILER COUPLING MECHANISM
Filed June 27, 1936    4 Sheets-Sheet 4
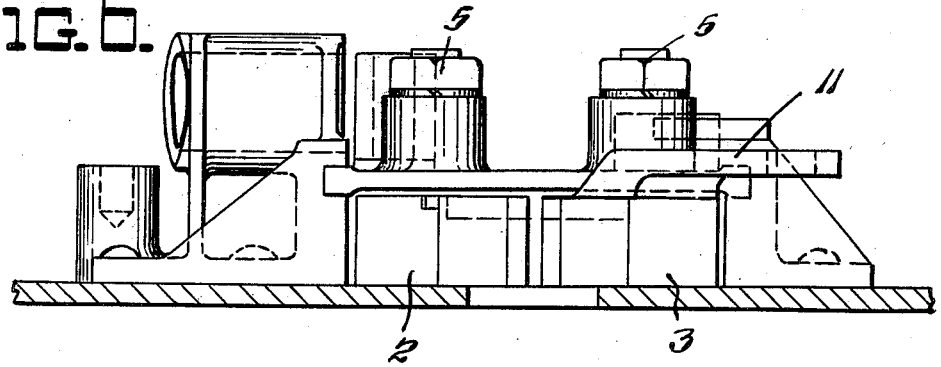
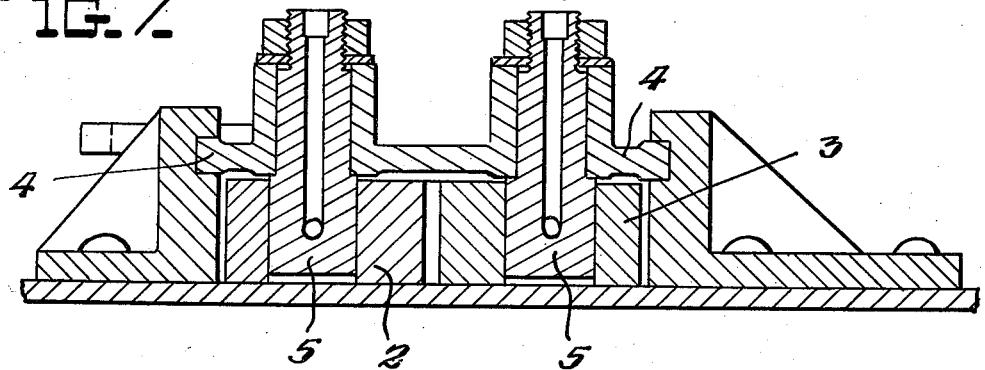
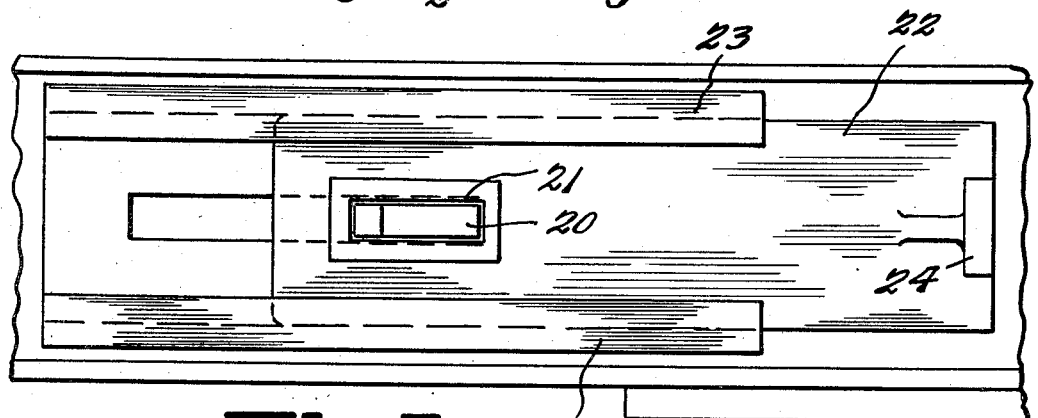
Inventor
GEORGE H. CONNORS
By Robert Robb
Attorneys Patented Sept. 1, 1936

2,053,132

UNITED STATES PATENT OFFICE 2,053,132

TRACTOR-TRAILER COUPLING MECHANISM

George H. Connors, Edgerton, Wis., assignor to Highway Trailer Company, Edgerton, Wis., a corporation Application June 27, 1936, Serial No. 87,785

8 Claims. (Cl. 280—33.1)

This invention pertains to combination tractor-trailer vehicles. The invention comprises certain novel connecting mechanism for coupling such vehicles together.

More specifically speaking, the invention comprises a coupling mechanism mounted upon the upper fifth wheel trailer frame and adapted for automatically coupling a tractor and trailer together. Additionally, the invention involves the combination of such coupling mechanism with a movable fifth wheel frame carried by the trailer and shiftable thereon forwardly as the traction vehicle is separated from the trailer, and rearwardly movable as the traction vehicle is moved into coupling relation with the trailer.

In the carrying out of the invention, the coupling mechanism hereinafter set forth is adapted to be applied to a movable auxiliary frame, such as shown in the Helms Patents Nos. 1,862,115, 1,785,-697, and Re. 18,821, wherein the said frame includes supporting means for the front end of the trailer when the trailer is detached from the tractor, but the invention is adaptable to trailers wherein a movable upper fifth wheel supporting frame is carried by the trailer, whether said frame includes supporting mechanism for the front end of the trailer, or not.

A preferred embodiment of the invention is illustrated in the accompanying drawings, in which—

Figure 1 is a plan view showing the coupling mechanism of the trailer in its operated, closed, or locked position, the main frame of the trailer being shown in a fragmentary manner and the coupling mechanism being carried by the so-called auxiliary frame.

Figure 2 is a fragmentary view showing a portion of the carriage locking mechanism that really belongs at the top left portion of the view of Figure 1.

Figure 3 is a view similar to Figure 1, with the parts adjusted as when the coupling mechanism is open and ready to receive the king pin on the tractor vehicle.

Figure 4 is a sectional view taken on the line 4—4 of Figure 1, looking in the direction of the arrow.

Figure 5 is a sectional view taken on the line 5—5 of Figure 1, looking in the direction of the arrows.

Figure 6 is a sectional view on the line 6—6 of Figure 1, looking in the direction of the arrows.

Figure 7 is a sectional view on the line 7—7 of Figure 1, looking in the direction of the arrows.

Figure 8 is a fragmentary side view showing more clearly the actuating slide for shifting the carriage locking mechanism to release the carriage for forward opening movement of the coupling jaws.

The mechanism illustrated in the drawings involves primarily those parts which are carried by a trailer vehicle. Such a trailer vehicle is illustrated in the Helms patents previously referred to, especially Patent No. 1,862,115. Since the invention lies primarily in the mechanism for coupling the tractor and trailer vehicles together and for locking certain parts on the trailer vehicle in operated positions, the constructions of the tractor and trailer features are not material to the invention.

In the drawings, A designates the main frame of the trailer, and B is an auxiliary frame mounted to slide forwardly and rearwardly on the main frame A. The auxiliary frame B comprises side channel members in which operate rollers 1 which are carried by the main frame A, said rollers 1 adapted to guide the auxiliary frame B in its forward and rearward movements upon the main frame A. According to the adaptation of the auxiliary frame B as shown in Helms Patent No. 1,862,115, when the said frame moves rearwardly, supporting wheels, not shown, at the rear end of the frame move upwardly to inoperative positions so as no longer to support the front end of the trailer, as when detached from the tractor. The forward movement of the frame B on the main frame A will, according to the preferred embodiment of the invention, cause the rear end of the frame and its supporting wheels or rollers to be lowered to the ground so as to become inoperative. When the auxiliary frame B is at its rearward adjustment on the main frame A, it will be locked in such position by suitable means disclosed in the said Helms patents, and not material to the present invention.

The coupling mechanism of this invention embodies certain features of construction known in the art and shown in the Culhane Patent No. 1,233,849 issued July 17, 1917, but, according to the invention, the said construction has been adapted to the particular use desired in a tractor-trailer combination vehicle for enabling a full automatic coupling action of a trailer with the traction vehicle, according to the general principle of action found in the Helms patents previously mentioned.

Said coupling mechanism includes the coupling jaws 2 and 3 which are adapted to receive therebetween a king pin projecting upwardly from the fifth wheel of a traction vehicle. The jaws 2 and 3 are mounted upon a carriage or slide unit 4 and said jaws are pivotally supported at 5. The rear ends of the jaws 2 and 3, when the jaws are closed, lie normally in divergent relation, the tails 2' and 3' of the jaws 2 and 3, respectively, being held apart by means of an actuating wedge 6. In other words, as the carriage or slide unit 4 moves rearwardly, the inner faces of the tails 2' and 3' operate on the wedge 6 to cause separating movement of the rear ends of the jaws 2 and 3 and to bring the front or king pin engaging portions of the jaws together. As the part 4 moves forwardly the tails 2' and 3' of the jaws move away from the wedge 6 and a spring 7 for the jaw 2 and a spring 8 for the jaw 3 pull the two jaws apart so they assume the positions shown in Figure 3.

The spring 8 connects with the jaw 3 by being directly connected to a lug on a pivoted lever 9 the pivot of which is designated 10. In turn, the lever 9 at its front end is connected by an arm 11 and pin 12, the pin 12 entering an elongated slot 13 in the front end of the lever 9. The lever 9 is connected to a lock member 14 outstanding rigidly therefrom and capable of engaging in front of the roller 1 at the same side of the frame B, as will hereinafter be more fully described.

Locking means for holding the carriage or slide unit 4 in its rearward position are also provided, and include a locking plunger 15 connected with a trip lever 16 pivoted to the auxiliary frame B at 17. The trip lever 16 has a spring 18 acting thereon to normally project the locking plunger 15 in a direction such that it will engage in front of an abutment 19 on the carriage or slide unit 4.

The trip lever 16 has an outstanding cam arm 20 which passes through an opening in the adjacent side of the auxiliary frame B and also through an opening 21 in an actuating plate 22 which is slidably mounted in guides 23 on the side channel of the frame B adjacent to the trip lever 16. The front end of the actuating plate 22 is equipped with an abutment member 24 capable of engaging with the roller 1 at the left side of Figure 3. The front outer end portion of the arm 20 has an inclined cam or wedging portion 25, all for a purpose to be hereinafter described.

A suitable grease conduit 26 for the pivots 5 is employed, and similar conduits 27 and 28 for the bearing of the plunger 15 and the bearing for the lock member 14, are provided. These conduits may be equipped with alemite fittings to be used in the customary manner.

The operation of the invention as above set forth is as follows:—

Assuming that the parts are in the position of Figure 3, a tractor having its king pin on a lower fifth wheel carried thereby, is backed in the direction of the trailer, so that the said king pin will enter between the diverging guides C that make up a portion of the front end of the auxiliary frame B. At a suitable point in the rearward movement of the trailer the king pin will enter between the jaws 2 and 3, strike the rear portions of said jaws and move the carriage or slide unit 4 rearwardly to cause the tails 2' and 3' of the jaws to ride on the diverging cam or wedge portions of the member 6. The engagement of the parts 2' and 3' with the member 6 incident to the rearward movement of the carriage 4 spreads the parts 2' and 3' and causes the jaws 2 and 3 to close and lock around the king pin. During the above action it will be noted, according to Figure 3, that the lock member 14 is in advance or in front of the adjacent roller 1, so that the frame B cannot move rearwardly save for a very slight distance, until the member 14 engages the roller 1. At this time, however, the carriage 4 may continue to move rearwardly whilst the frame B is locked stationary by the member 14. However, when the jaws 2 and 3 have been fully closed by the wedge member 6, as described, the front end of the lever 9 will have been pulled leftward as seen in Figure 3, until it assumes the position of Figure 1. At this time the king pin is fully coupled and locked in the jaws 2 and 3, and at the same time the lock member 14 will have been pulled to the left to disengage it from in front of the roller 1 with which it has been cooperating. In this manner, now that the king pin is locked to the jaws 2, carriage 4 and frame B, the frame B is released to move rearwardly of said king pin incident to backward movement of the traction vehicle.

When the carriage or member 4 has reached the rearward limit of its movement as shown in Figure 1, the abutment 19 on said carriage will have passed to a point just in rear of the locking plunger 15 and the latter, under the action of the spring 18, will move to the right and engage in front of the abutment 19 and thus lock the carriage in its rearmost position of movement relatively to the frame B. The position of the carriage 4 when so locked is illustrated in Figure 1, and the member 15 ensures against any possibility of release of the king pin of the traction vehicle from the jaws 2 and 3 so long as the auxiliary frame B is in its rearmost position upon the main frame A. The auxiliary frame B is retained in its said rearmost position by locking members carried on the main frame and cooperative with the front end of the auxiliary frame, as disclosed by Helms Patent No. 1,862,115. These locks may be at front or rear of auxiliary frame.

When it is desired to uncouple the trailer from the traction vehicle the locking members that lock the frame B rearwardly upon the frame A are released manually. Thereupon, the traction vehicle is driven forward, causing first the auxiliary frame B to move forward until the actuating slide 22 is operated by engagement of its abutment 24 with the left roller 1, as seen in Figure 3. Such action causes a relative movement of the actuating member or slide 22 rearward relatively to the frame B, and the front end of the opening 21 in the member 22 is caused to impinge the cam 25 of the cam arm 20 and thus to rock the trip lever 16 to its full line position of Figure 3.

Up to this time the carriage 4 has been locked rearwardly, preventing release of the king pin during forward movement of the tractor, but when the trip lever 16 is locked to its position of Figure 3 by the actuating member or slide 22, the locking plunger 15 is withdrawn from in front of the abutment 19 and further continuing forward movement of the traction vehicle will cause a forward movement of the carriage or slide unit 4 on and relative to the auxiliary frame B to thereby permit the tails of the jaws 2 and 3 to move forwardly from the wedge 6. Thus, the jaws 2 and 3 reach about the positions of Figure 3 relatively to the wedge 6 and are caused to open by means of the forward movement of the king pin, and springs 7 and 8 are primarily to retain the jaws in open position. The movement of the jaws as described above will simultaneously project the lock member 14 to the position shown in Figure 3, wherein it is in advance of the roller 1.

near to it, ready to cooperate with this roller in the manner described when the cycle of operation herein given was begun.

Having thus described my invention, what I claim as new and desire to secure by Letters Patent of the United States, is—

1. In trailer coupling mechanism of the class described, in combination, a main trailer frame, an auxiliary frame movable thereon, king pin coupling means mounted for bodily movement on the auxiliary frame, lock means operable by said coupling means and adapted to lock the auxiliary frame against rearward movement upon the main frame until a predetermined time in the bodily movement of the coupling means on said frame, and other lock means for locking the coupling means at one of its limits of movement on the auxiliary frame.

2. In trailer coupling mechanism of the class described, in combination, a main trailer frame, an auxiliary frame movable thereon, king pin coupling means mounted for bodily movement on the auxiliary frame, lock means operable by said coupling means and adapted to lock the auxiliary frame against rearward movement upon the main frame until a predetermined time in the bodily movement of the coupling means on said frame, other lock means for locking the coupling means at one of its limits of movement on the auxiliary frame, and instrumentalities carried by the auxiliary frame operable to release the coupling means from the action of the last mentioned lock means.

3. Means as set forth in claim 2, wherein the last named instrumentalities comprise an actuating member movable on the auxiliary frame, and means on the main frame to be engaged by the actuating member for shifting the lock means with which the actuating member cooperates.

4. In trailer coupling mechanism of the class described, in combination, a main frame, an auxiliary frame movable thereon, coupling means carried by the auxiliary frame and comprising a carriage bodily movable on the auxiliary frame, coupling jaws carried by said carriage, a member on the auxiliary frame cooperative with said jaws to cause closing thereof incident to movement of the carriage rearwardly with its coupling jaws, first locking means cooperative with said coupling means for holding the carriage near one limit of its movement, and other locking means cooperating with the carriage for holding said carriage at the other limit of its movement.

5. Means as set forth in claim 4, combined with an actuating member mounted on the auxiliary frame for releasing the last mentioned locking means, and a member carried by the main frame cooperating to operate said actuating member of the auxiliary frame.

6. In trailer coupling mechanism of the class described, in combination, a main trailer frame, an auxiliary frame movable upwardly and rearwardly thereon, a carriage slidably mounted on the auxiliary frame for forward and rearward movement, coupling jaws movable bodily with the carriage and adapted to engage a king pin, a member cooperative with said coupling jaws to close them on rearward movement of the carriage, means for opening the coupling jaws on forward movement of the carriage, one of the last mentioned means comprising a lever coacting with one of the coupling jaws and a lock member operable by said lever, a member on the main frame cooperating with said lock member to prevent substantial rearward movement of the auxiliary frame until the coupling jaws are closed, and other locking means on the auxiliary frame for locking the carriage in its rearmost position after it has been shifted to such position as the coupling jaws are closed.

7. Means as set forth in claim 6, in which the locking means last mentioned comprise a locking plunger on the auxiliary frame, an abutment engaged by said plunger and carried by the carriage, a trip lever for operating the plunger, an actuating member on the auxiliary frame for shifting the trip lever to release the plunger from the abutment, and a member on the main frame cooperative with said actuating member for causing it to operate the trip lever.

8. In trailer coupling mechanism of the class described, in combination, a main trailer frame, an auxiliary frame movable upwardly and rearwardly thereon, a carriage slidably mounted on the auxiliary frame for forward and rearward movement, coupling jaws movable bodily with the carriage and adapted to engage a king pin, a member cooperative with said coupling jaws to close them on rearward movement of the carriage, means for opening the coupling jaws on forward movement of the carriage, one of the last mentioned means comprising a lever coacting with one of the coupling jaws and a lock member operable by said lever, a member on the main frame cooperating with said lock member to prevent substantial rearward movement of the auxiliary frame until the coupling jaws are closed, other locking means on the auxiliary frame for locking the carriage in its rearmost position after it has been shifted to such position as the coupling jaws are closed, the last mentioned locking means comprising a locking plunger on the auxiliary frame, an abutment engaged by said plunger and carried by the carriage, a trip lever for operating the plunger, an actuating member on the auxiliary frame for shifting the trip lever to release the plunger from the abutment, and a member on the main frame cooperative with said actuating member for causing it to operate the trip lever, the first mentioned lock member having a cam cooperative with the part on the main frame with which it engages, to enable forward movement of the auxiliary frame, and the locking plunger being formed with a cam engageable by the rear end of the carriage to enable the plunger to be forced to a position permitting the abutment member coacting therewith to pass same.

GEORGE H. CONNORS.